Feb. 5, 1963 C. K. DONNELL 3,076,375
COLORIMETER WITH LINEAR ABSORBANCE SCALE
Filed July 29, 1960 2 Sheets-Sheet 1
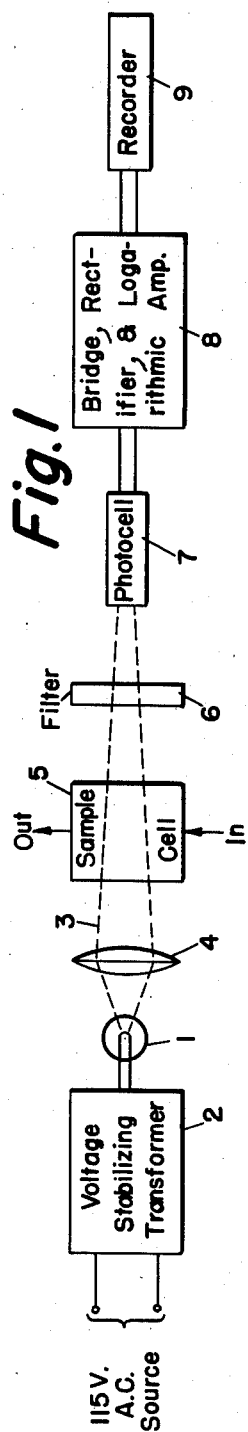
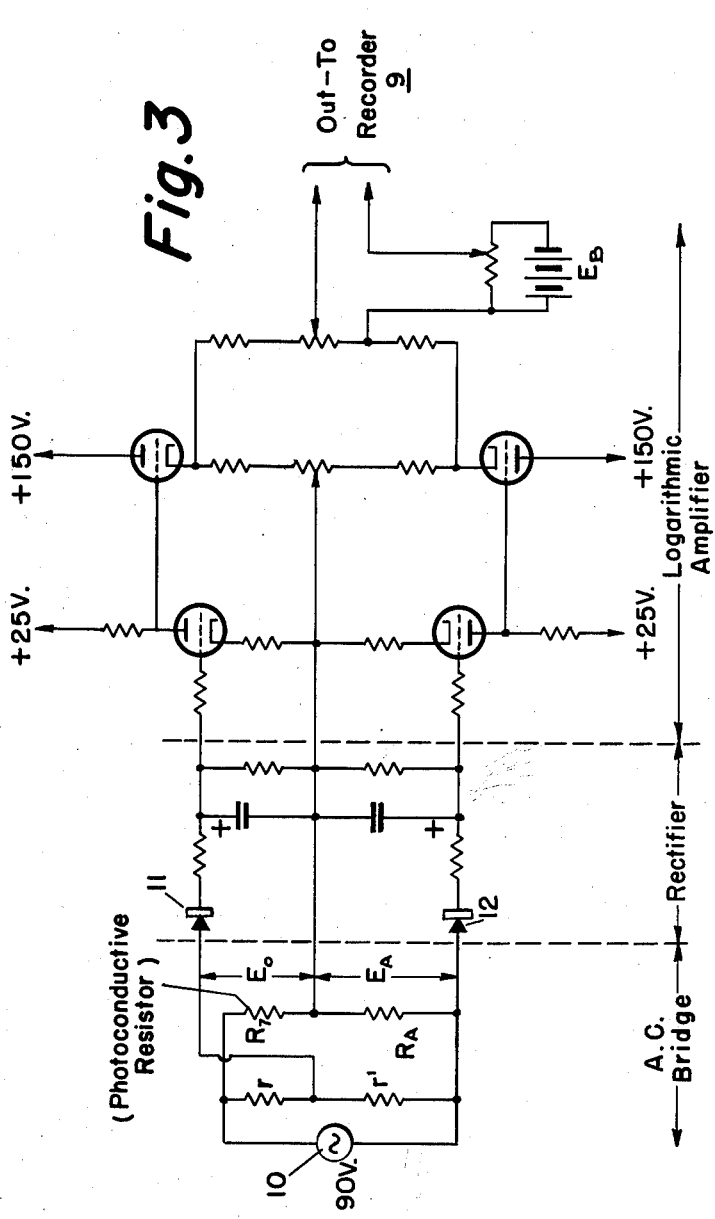
INVENTOR.
CONARD K. DONNELL
BY *Robert O. Spindle*
ATTORNEY Feb. 5, 1963  C. K. DONNELL  3,076,375
COLORIMETER WITH LINEAR ABSORBANCE SCALE
Filed July 29, 1960  2 Sheets-Sheet 2

Recorder Scale Reading

INVENTOR.
CONARD K. DONNELL
BY
ATTORNEY

United States Patent Office 3,076,375
Patented Feb. 5, 1963

3,076,375
COLORIMETER WITH LINEAR ABSORBANCE SCALE
Conard K. Donnell, Springfield, Pa., assignor to Sun Oil Company, Philadelphia, Pa., a corporation of New Jersey
Filed July 29, 1960, Ser. No. 46,216
3 Claims. (Cl. 88—23)

This invention relates to a colorimeter, and more particularly to a novel type of colorimeter having a linear absorbance scale.

Color is frequently included in the specifications of refinery products, and the quality of intermediate or final products can frequently be monitored by measuring color. Many types of colorimeters have been devised to measure the light transmission characteristics of solid, liquid, and gaseous materials over wide ranges of light transmission value and wavelength.

In the petroleum industry, several arbitrary color scales have been used extensively to characterize different products. Most of these involve visual comparison of the sample with a standard, which latter is usually a piece of glass with reproducible color and light transmission values.

However, a more fundamental color scale, which eliminates the need for arbitrary glass color standards, has been used extensively for a number of years. In addition to being fundamental, a much wider range of colors can be accommodated with this scale than by any of the other methods of color measurement. The results obtained by the use of this color scale or method of measurement are termed "Optical Density Colors," or simply "O.D. Colors."

The method just referred to involves measuring the fraction of the incident light of a specified wavelength (usually 5250 A., or 525 millimicrons) which is transmitted by the sample. In this connection, it is noted that a "representative wavelength" for green light is 5200 A.=520 m$\mu$. Optical Density Color is defined as a function of the fraction T of the incident light which is transmitted. Specifically, $$\text{O.D. Color} = 100 \log \left(\frac{1}{T}\right)$$

By way of example, when T is equal to unity or 100%, the O.D. Color has the value zero; when $T=0.1$ or 10%, the O.D. Color has the value 100, etc. The quantity $$\log \frac{1}{T}$$

is generally known as "absorbance."

Most simple colorimeters measure the percent transmission, T, so that O.D. Color, the quantity desired, is a logarithmic function of the measured quantity. For several different reasons, among which may be mentioned the more involved computations required for the desired results, a logarithmic-scale measuring device is much less desirable than a linear-scale measuring device.

Accordingly, an object of this invention is to provide a colorimeter which produces an output (scale reading) directly proportional to O.D. Color, so that the color scale is linear, rather than logarithmic. Therefore, the scale reading on the output recorder of the colorimeter can simply be multiplied by a constant factor, to obtain the O.D. Color value of the sample.

The objects of this invention are accomplished, briefly, in the following manner: A beam of light is projected through a sample to be analyzed for color. The light transmitted through the sample is passed through a color filter, which transmits substantially only the desired wavelength (according to the previous description, this may be 5250 A.), and then to a light-detecting element or photocell, in the form of a photoconductive resistor. This resistor is connected into an alternating current bridge circuit, from which output is taken and fed to a logarithmic amplifier. The output of the amplifier is fed to a suitable recorder having a linear scale. The reading on the recorder is linearly related to the O.D. Color value.

A detailed description of the invention follows, taken in conjunction with the accompanying drawings, wherein:

FIG. 1 is a block diagram of a colorimeter according to this invention;

FIG. 3 is a schematic of circuitry used in the colorimeter; and

Figure 2:
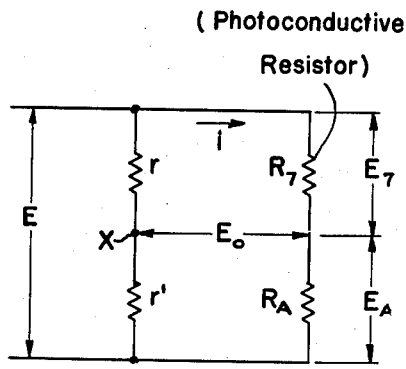
FIG. 2 is a schematic of the bridge circuit utilized in the colorimeter.

Refer first to FIG. 1, which is a block diagram of a colorimeter according to this invention. An incandescent lamp 1 is energized from a commercial 115 v. alternating current power source, through a voltage-stabilizing transformer 2, so that the lamp 1 is operated from a stabilized voltage source. Lamp 1 may be an automotive-type lamp, such as one ordinarily utilized for automobile tail lights. The light supplied by lamp 1 is collimated to a beam 3 by a condensing lens 4, and this beam is passed through a sample cell 5 in which is located the sample whose color is to be measured. If the sample is a fluid, it is preferably fed through cell 5 in a continuous manner, by means of the inlet and outlet indicated. The light transmitted through sample cell 5 (indicated in dotted lines as a continuation of beam 3) is passed through a color filter 6, which transmits light of substantially only the desired wavelength. In other words, filter 6 operates to restrict the light transmitted therethrough to substantially a predetermined wavelength. For the O.D. Color scale previously referred to, this predetermined wavelength would be 5250 A.

The light transmitted by filter 6 is passed on to a photocell detector 7. This photocell is thus receptive of the light of a specified or predetermined wavelength (as governed by filter 6) which is transmitted by the sample in cell 5. Photoconductive resistors are used for the photocell 7. Each of these resistors consists of a small crystal of cadmium sulfide or cadmium selenide, which is available in the form of a capsule 1/4 inch in diameter and 1/2 inch long. A bundle of seven of these essentially covers the area of the light path from the sample cell 5. These seven capsules or resistors are wired in parallel.

The photoconductive resistors referred to have an extremely high resistance, on the order of thousands of megohms, in the dark, but when illuminated by a strong light this resistance drops to only tens of thousands of ohms. Cadmium sulfide is most sensitive to visible light, while cadmium selenide is most sensitive to near infrared light.

The use of a photoconductive resistor, as the light-detecting or light-responsive element of the photocell 7, is greatly preferred to the use of a vacuum phototube for this same purpose. In the first place, the photoconductive resistor changes resistance to a much greater extent than a vacuum phototube, for a given change in illumination. Thus, the former is much more sensitive, and it is also more stable in operation. Furthermore, when a vacuum phototube is used as a light detector, a current amplifier is required, due to the extremely low current carried by the phototube. In contrast, when using a photoconductive resistor, such an amplifier is not needed, since the current flowing through such resistor under conditions of maximum light may be as much as two to three milliamperes; the photoconductive resistor could thus feed a recorder of the strip-chart type directly, if desired. Also, since the illuminated photoconductive resistor is a low impedance device, it can easily be located remotely (up to 200 feet, for example) from the indicating or amplifying equipment; this cannot be done with a vacuum phototube, since the latter is a high impedance device.

Lead sulfide has previously been proposed as a material for photoconductive resistors. However, cadmium sulfide and cadmium selenide are much more desirable materials than lead sulfide for this use. The effect of temperature on the cadmium compounds mentioned is very low, much lower than such effect on lead sulfide. That is to say, the variation with temperature of the illumination sensitivity of the cadmium compounds is very low, compared to the corresponding illumination sensitivity variation for lead sulfide.

The photoconductive resistor group or bundle 7 described is connected into a four-arm bridge circuit, this bridge circuit being followed by a rectifier and then a logarithmic amplifier, as will be later described in connection with FIGURES 2 and 3. The bridge, rectifier, and logarithmic amplifier are contained in a unit 8. The output of the logarithmic amplifier in unit 8 is fed to a recorder 9 of the strip-chart type. If the colorimeter is used for continuous analysis of a fluid stream, then such stream is caused to flow continuously through the sample cell 5, and the chart of recorder 9 is continuously driven, in any well-known manner.

With the colorimeter and photocell detectors described, the resistance of the photoconductive resistors in unit 7 was found to be an inverse function of the illumination. This may be expressed as follows:

$$R_7 = \frac{K}{T} + A \tag{1}$$

Where $R_7$ is the resistance of photocell 7, K and A are constants, and T is the fraction of the incident light transmitted through the sample 5 to the photocell 7. From Equation 1, $$\frac{1}{T} = \frac{1}{K}(R_7 - A) \tag{2}$$

So, $$\log \frac{1}{T} = \log \left[\frac{1}{K}(R_7 - A)\right]$$

or $$\log \frac{1}{T} = \log \frac{1}{K} + \log (R_7 - A)$$

or $$\log \frac{1}{T} = k + \log (R_7 - A)$$

where $k$ is a constant. Since by definition, $$\text{Color} = 100 \log \frac{1}{T} \tag{3}$$

then $$\text{Color} = 100\, k + 100 \log (R_7 - A) \tag{4}$$

A detector and amplifier which solves Equation 4 will give a linear output, in terms of color.

The detector described (of photoconductive resistor type), which is used for photocell 7, is connected into the four-arm bridge circuit illustrated in FIG. 2, in which $R_7$ is again the photocell resistance, and $R_A$ is a fixed resistor equal in resistance to the constant A in Equation 1 above. Resistors $r$ and $r'$ are equal to each other in value, and are small compared to $R_7$ and $R_A$, so that the voltage at point X is half of E and essentially constant. Let the voltage across the bridge diagonal be $E_0$, as indicated.

Then, $$E_0 = \frac{E}{2} - E_A \tag{5}$$

Rearranging, $2E_0 = E - 2E_A = (E - E_A) - E_A = E_7 - E_A$.

Since $E_7 = iR_7$ and $E_A = iR_A$, $$2E_0 = i(R_7 - R_A) \tag{6}$$

Since, $$i = \frac{E_A}{R_A}, \quad 2E_0 = \frac{E_A}{R_A}(R_7 - R_A)$$

Rearranging, $$\frac{E_0}{E_A} = \frac{R_7 - R_A}{2R_A} = k'(R_7 - R_A) \tag{7}$$

since $R_A$ is a fixed resistor.

It may be seen from Equation 4 that color is proportional to log $(R_7 - A)$, or to log $(R_7 - R_A)$, since $R_A$ has a numerical value equal to A. So, from Equation 7, color is also proportional to $$\log \frac{E_0}{E_A} \tag{8}$$

Refer now to FIG. 3. As described in connection with FIG. 2, the photoconductive resistor is connected into a four-arm bridge circuit, as one arm thereof. Resistor $R_7$, as before, represents the group or bundle of photoconductive resistors which comprise the photocell 7 in FIG. 1. The bridge circuit is made up, as in FIG. 2, of the resistors $r$, $r'$, $R_7$, and $R_A$. The bridge circuit is operated on alternating current, and for this purpose an alternating current source 10 (of 90 volts, for example) is connected across one diagonal of the bridge. This voltage source corresponds essentially to the voltage E in FIG. 2. As may be seen from Equation 8, color is proportional to the logarithm of the ratio of the two voltages $E_0$ and $E_A$, the first of these voltages being that appearing across the diagonal of the bridge circuit and the second of these voltages being that appearing across resistor $R_A$, the fixed resistor.

The circuit illustrated at the right-hand side of FIG. 3 is a logarithmic amplifier which gives an output proportional to the logarithm of the ratio of two input voltages. This logarithmic amplifier circuit is quite similar to that described by Walter J. Ives on page 100 of the August 1949 issue of Electronics, and operates in a similar manner. The amplifier of FIG. 3 has two inputs to which the voltages $E_0$ and $E_A$ are respectively coupled. To obtain proper polarity relationships for the amplifier inputs, the bridge circuit is operated on alternating current, as at 10, and the bridge output voltages $E_0$ and $E_A$ are rectified (by means of the rectifier including the diodes 11 and 12) and filtered to produce D.C. voltages of the proper sign for the logarithmic amplifier.

The logarithmic amplifier gives a voltage output proportional to $$\log \frac{E_0}{E_A}$$

which is proportional to color, as set out in Equation 8. This output is fed to the recorder 9, as indicated at the right-hand side of FIG. 3.

The battery denoted by $E_B$ provides a bucking voltage which brings the amplifier output to zero volts for zero color (100% transmission). Essentially, this bucking voltage is related to the constants $k$ and $k'$ in the equations hereinabove set out.

If desired, the bucking voltage $E_B$ just referred to can be eliminated, if conditions are made such that the output of the logarithmic amplifier, across the cathodes of the upper and lower right-hand tubes in FIG. 3, will never go negative. To produce this result, $E_A$ can never be larger than $E_0$ (the amplifier output being, as stated, proportional to $$\log \frac{E_0}{E_A})$$

To prevent $E_A$ from becoming larger than $E_0$, at least two different expedients may be employed. First, the maximum light intensity may be limited (by limiting the voltage applied to lamp 1, FIG. 1) so that the resistance of photocell resistor $R_7$ never decreases below $3R_A$. Alternatively, $R_A$ can be varied so that the resistance of $R_7$ never decreases below $3R_A$.

Figure 4:
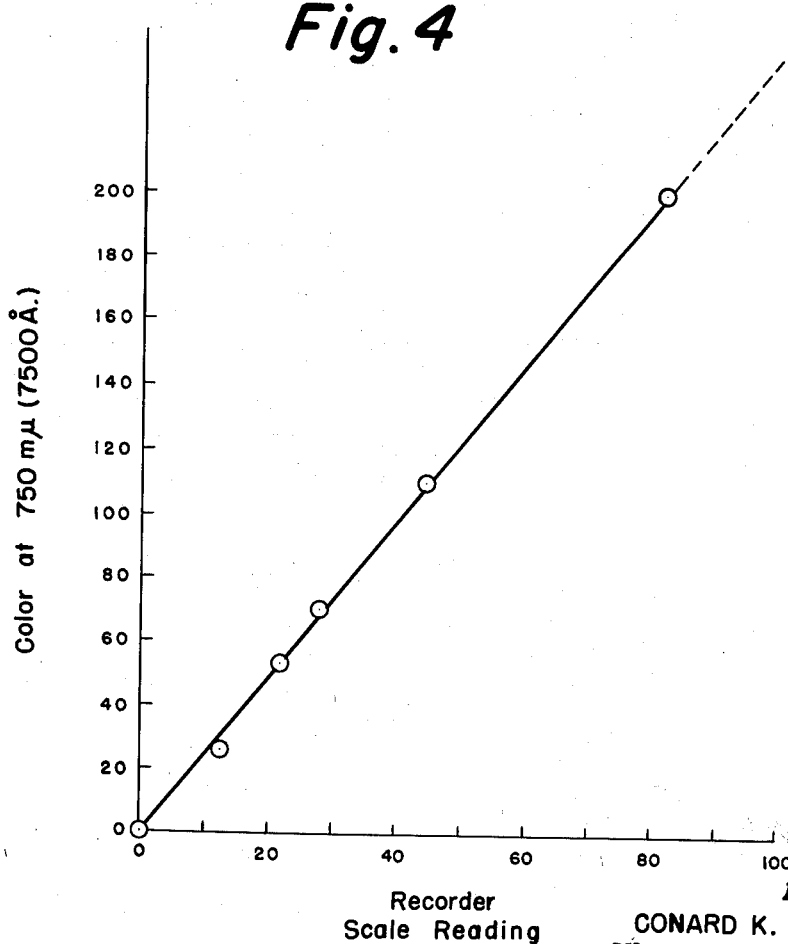
FIG. 4 is a typical calibration curve for the colorimeter of this invention.

FIG. 4 is a test curve, analogous to a calibration curve, obtained with a colorimeter constructed according to this invention. This curve represents test results, and was made in order to check out or prove the linearity of the color (or absorbance, since this latter is simply a submultiple of color) scale. For various samples of a so-called "heavy vacuum gas oil," readings were taken on the colorimeter recorder, using light at 7500 A. (which in this case was the wavelength passed by filter 6), which is in the infrared range. This particular wavelength was used, rather than 5250 A., because of the color of this particular sample material. The colorimeter readings obtained were scaled off along the horizontal axis. The color values for these same samples (some six samples, in all, being used) were obtained from an independent laboratory measurement, not using the colorimeter; these color values were then scaled off along the vertical axis, to plot the test points of FIG. 4. It can be seen, in FIG. 4, that the test points lie substantially exactly along a straight line, using linear scales on both the horizontal and vertical axes. This proves that the colorimeter of this invention has a linear color or absorbance scale, as desired. Strictly speaking, of course, the color values along the vertical axis are not "O.D. Colors," since light of the specified wavelength (5250 A. for "O.D. Color") was not used; however, the principles are the same.

Once a calibration curve such as that in FIG. 4 has been drawn up, it can be thereafter used to read off directly the color value, for any measured recorder scale reading obtained with the colorimeter, on a test sample. It is pointed out that, once the linearity of the color scale has been proven, the calibration curve, for any particular wavelength of light, may be obtained in a much simpler manner than that described in connection with FIG. 4. A single sample may be analyzed in the colorimeter to obtain a corresponding scale reading on recorder 9; the color value of this same sample may be obtained by some other laboratory measurement. By mere division of one of these two numerical values by the other, the constant proportionality factor (by which scale reading must be multiplied to obtain color value) is obtained. Thereafter, this same proportionality or multiplying factor (which is a constant, due to the linearity of the color or absorbance scale with the inventive colorimeter) can be used to obtain the color value corresponding to any test reading on recorder 9.

Some typical applications of the colorimeter of this invention to the petroleum industry will now be described, all of these applications utilizing continuous analysis, by means of a stream of sample flowing continuously through the sample cell 5. Using the present colorimeter, the color of a refinery stream, such as a stream of "heavy vacuum gas oil," can be continuously measured and recorded; also, the output of the logarithmic amplifier disclosed herein could be used, through a suitable control network, to control the color of this stream so as to maintain it substantially at a constant value. Again, a small amount of dye is often added to gasoline for identification purposes; the dyed gasoline may be run through the present colorimeter for measurement of its color, and the colorimeter output used to control the dye concentration, to maintain it substantially constant. Again, in a petroleum pipeline, different products may be sent through the line in succession, without pause; a portion of the pipeline stream may be run through the colorimeter of this invention, to detect the interface between the different products by means of the color change at or adjacent the interface (the two products being of different colors).

What is claimed is:

1. In combination, means for projecting a beam of light through a sample to be analyzed, a photo-conductive resistor receptive of the light transmitted through said sample, means connecting said resistor into a four-arm bridge circuit as a first arm thereof, second, third, and fourth fixed resistors connected into said bridge circuit as respective arms thereof, the junction between said photoconductive resistor and said second resistor and the junction between said third and fourth resistors defining one diagonal of said bridge; a logarithmic amplifier constructed and arranged to provide an output proportional to the logarithm of the ratio between two input voltages applied separately to said amplifier, means applying the voltage across said one bridge diagonal to said amplifier as one of said input voltages, means applying the voltage across said second fixed resistor to said amplifier as the second of said input voltages, and means for utilizing the output of said amplifier.

2. Combination as set forth in claim 1, wherein the resistances of said third and fourth resistors are equal to each other and are small compared to the resistances of the first and second bridge arms.

3. Combination as set forth in claim 2, including also means for restricting the light received by said photoconductive resistor to substantially a predetermined wavelength only.

References Cited in the file of this patent

UNITED STATES PATENTS

| 2,406,716 | Sweet | Aug. 27, 1946 |
| 2,413,218 | Coroniti | Dec. 24, 1946 |
| 2,550,382 | Rouy | Apr. 24, 1951 |
| 2,939,361 | Hock | June 7, 1960 |

FOREIGN PATENTS

| 246,050 | Germany | Apr. 23, 1912 |

OTHER REFERENCES

Ives: "Logarithmic-Scale Noise Meter," August 1949, Electronics, pages 100 to 103. (Copy in the Scientific Library.)